United States Patent [19]
Motai et al.

[11] 3,970,028
[45] July 20, 1976

[54] VESSEL MOORING SYSTEM

[75] Inventors: Yoichi Motai, Urawa; Keijiro Gouda, Chofu; Atsuya Isono, Tokyo, all of Japan

[73] Assignees: Nippon Oil Company Ltd.; Miwa Shokai Company, Ltd., both of Tokyo, Japan

[22] Filed: Dec. 23, 1974

[21] Appl. No.: 535,570

[52] U.S. Cl. ................................ 114/230; 73/143
[51] Int. Cl.² .................................. B63B 21/16
[58] Field of Search ............... 114/230, 231, 144 B; 73/143, 141 A; 340/259, 272, 29; 254/173 R, 173 B, 184

[56] References Cited
UNITED STATES PATENTS

| | | |
|---|---|---|
| 2,414,161 | 1/1947 | Moore ............................ 73/141 A |
| 3,477,697 | 11/1969 | Schreier ............................ 254/184 |
| 3,740,741 | 6/1973 | Jones .................................. 340/272 |
| 3,886,887 | 6/1975 | Cunningham et al. .......... 114/144 B |
| 3,913,396 | 11/1975 | Elliot ................................. 114/230 |

*Primary Examiner*—Trygve M. Blix
*Assistant Examiner*—Sherman D. Basinger

[57] ABSTRACT

A vessel mooring system for mooring a vessel to a mooring facility on a wharf by means of a plurality of mooring systems, which mooring systems incorporate tension detectors therein, whereby the vessel is moored to the mooring facility in a well balanced condition by adjusting the tensions exerted on the respective mooring systems by using tension signals issued from the tension detectors. The aforesaid plurality of mooring systems each consist of fixing devices, such as a dolphin, hook formed on the fixing device, groups of ropes and winches on board the vessel.

10 Claims, 12 Drawing Figures

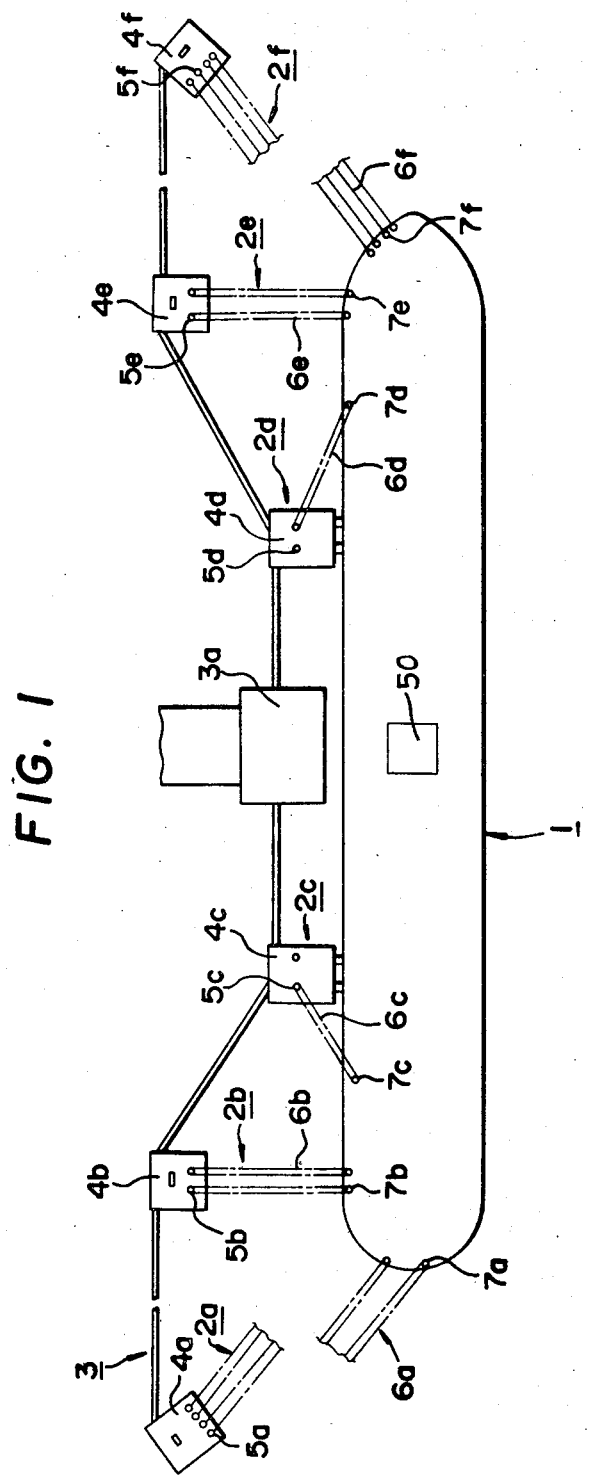

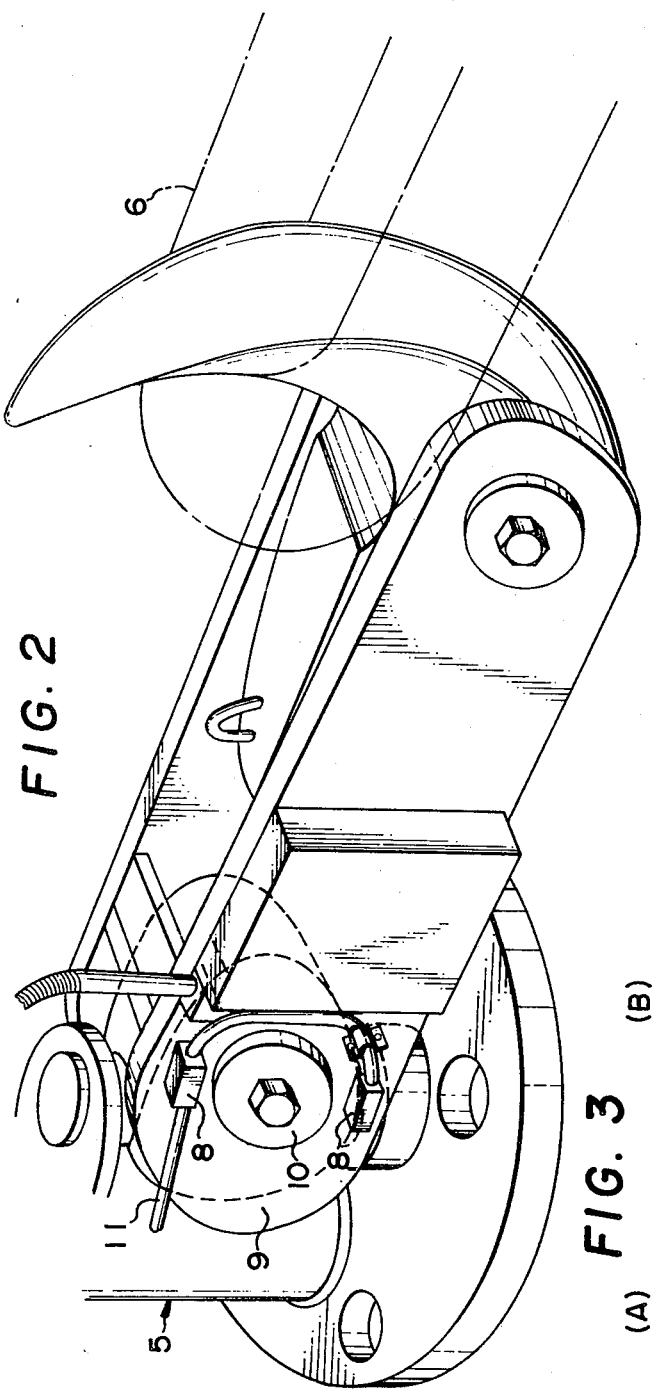
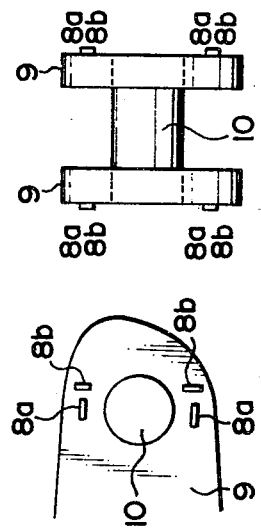

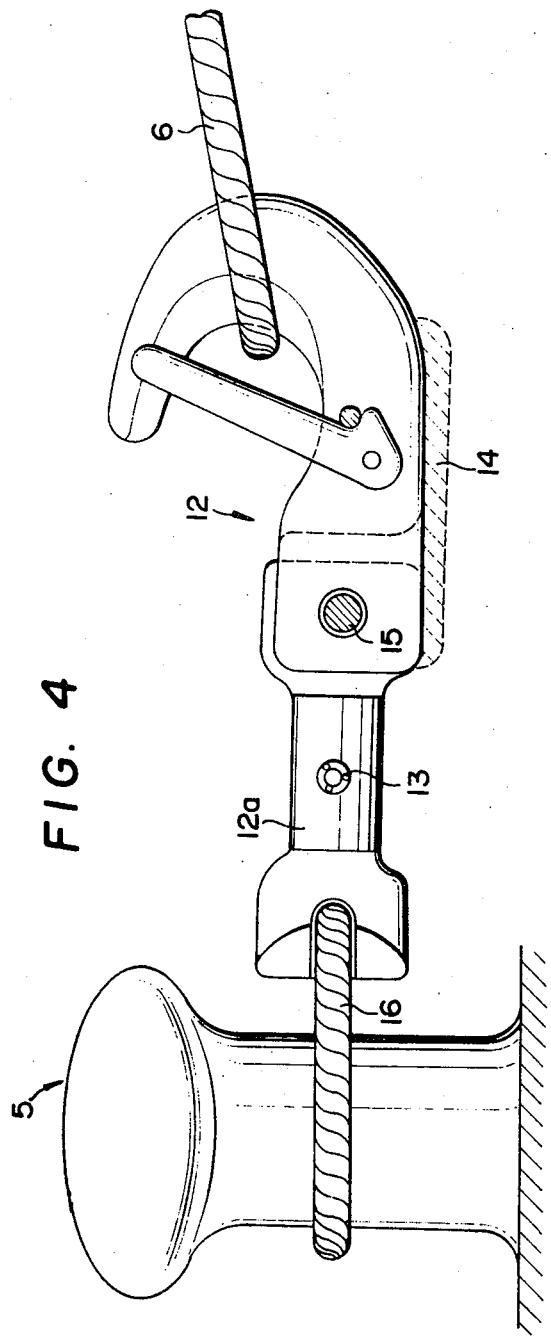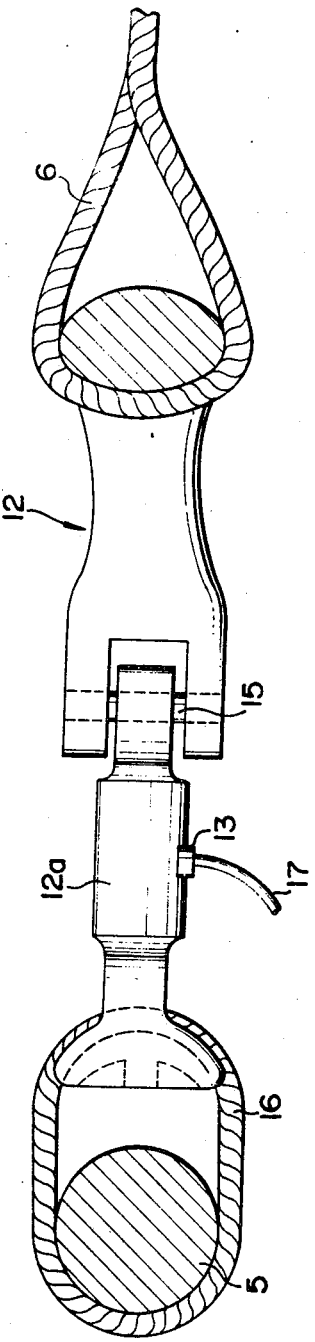
FIG. 4
FIG. 5

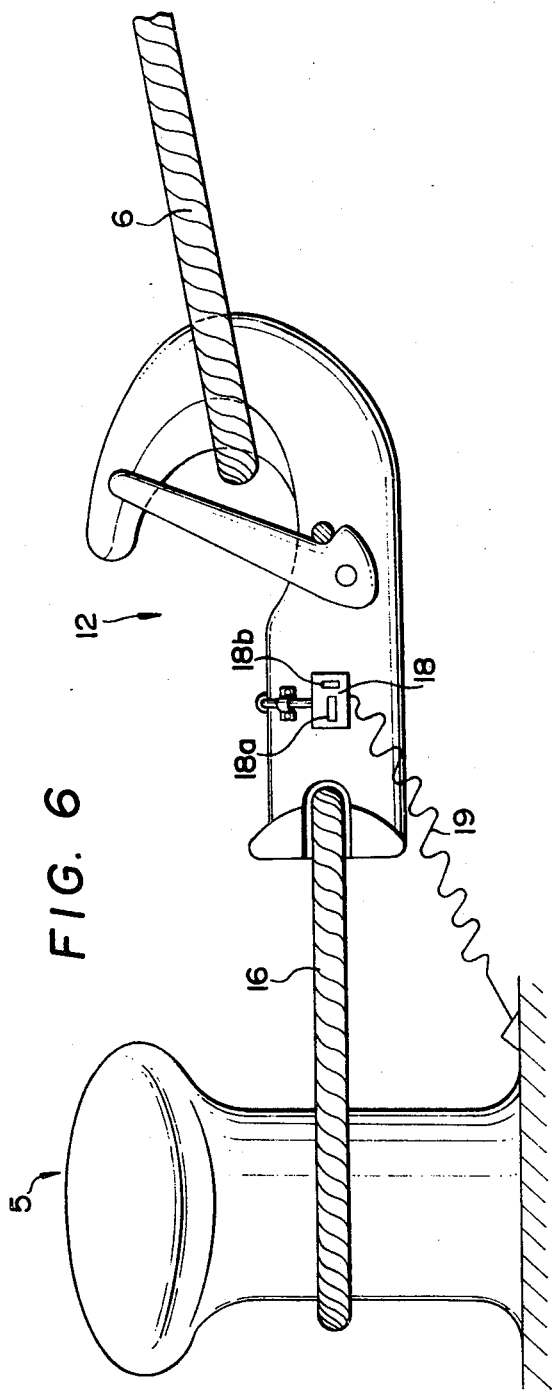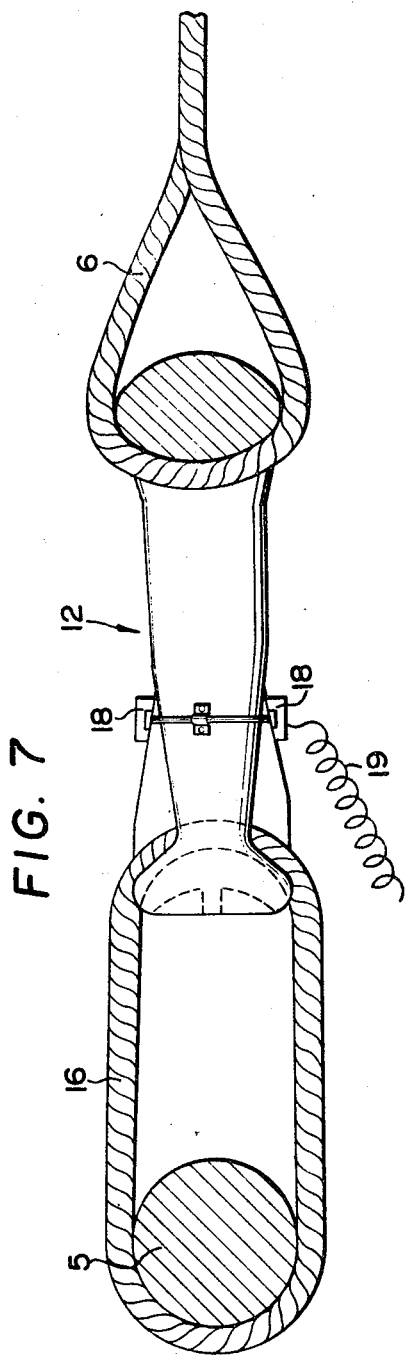

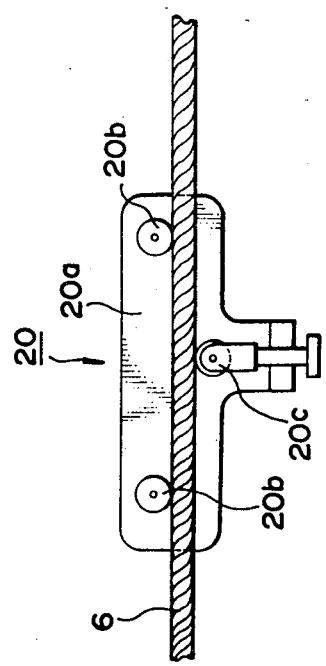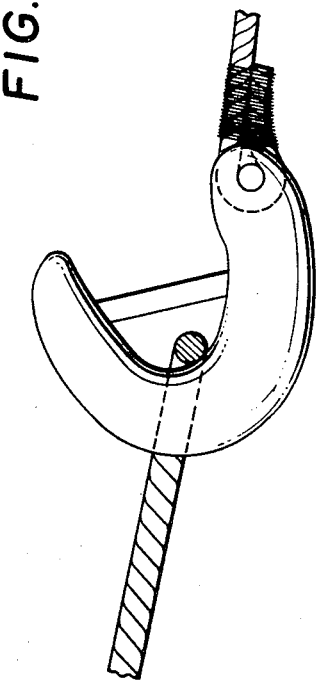

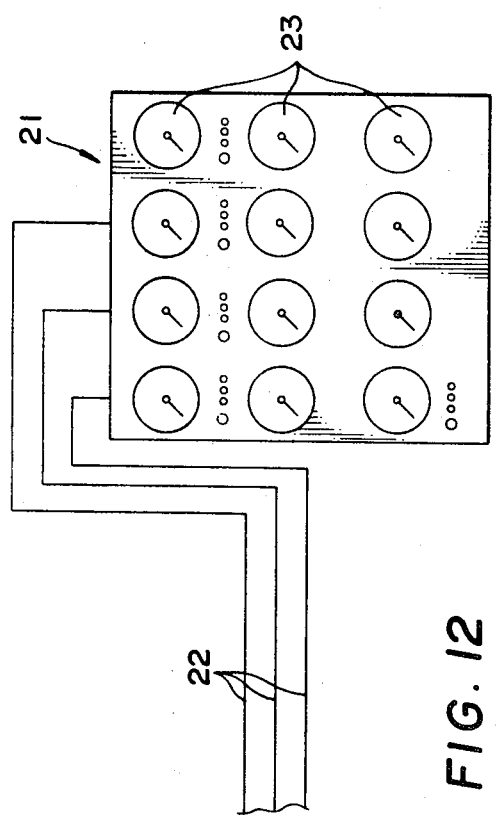
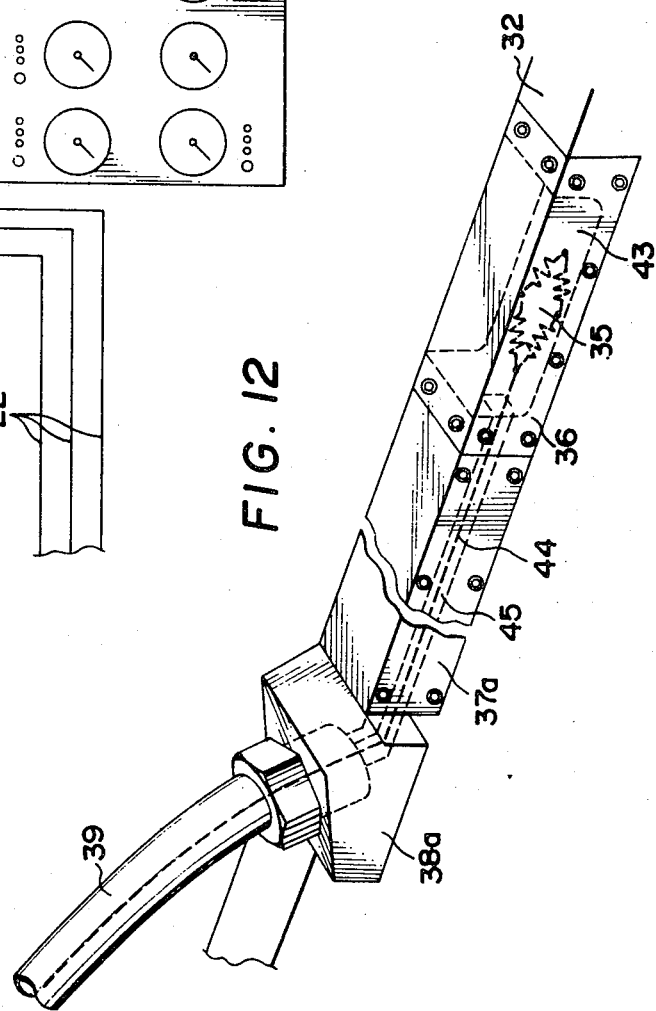

VESSEL MOORING SYSTEM

BACKGROUND OF THE INVENTION

1. Field of the Invention

This invention relates to a mooring system for use in mooring a vessel to a mooring facility on a wharf or a pier.

2. Description of the Prior Art

In case a vessel is moored alongside a quay to a mooring facility on a wharf, it is imperative to arrange a plurality of mooring means in a suitable condition, in consideration of wind pressure, waves or billows, tidal currents coming from every direction, so that a vessel may be moored in a well balanced condition. In general, the mooring means for use to this end of rope securing means such as hook or post are provided on the side of a mooring facility on a wharf, a winch on board the vessel and a plurality of ropes or wires tied down therebetween. In line with an increase in the size of vessels, there have been arisen difficulties in handling those ropes or wires for mooring vessels alongside the quay. More particularly, as vessels are increased in tonnage to as high as several hundred thousands tons, strength required for ropes should necessarily be increased. This leads to an increase in diameter of ropes. However, there are imposed limitations on the diameters of ropes of this kind, from viewpoints of winding and unwinding operations by means of a winch. To cope with this difficulty, there has been proposed an attempt to use a given number of a plurality of ropes as a unit group, so that such groups of ropes are used in the desired mooring conditions. Recently, the number of ropes required has been determined by dividing a maximum design tension strength for one group of ropes by an allowable tension strength for each rope.

However, such an attempt to use a given number of a plurality of ropes a unit group for using such groups of ropes in desired mooring conditions provides only a partial success in this problem. In other words, it was found to be quite difficult that every rope in such groups bears uniform tensional force. In addition, this problem is further plagued with increasing difficulties as the number of ropes is increased. This problem, i.e., adjustment for tension exerted on the respective ropes however has been resorted to a human perception. This apparently leads to the failure in achieving the distribution of uniform tension for the respective ropes. Thus, in the event that tensions higher than a design maximum tension are applied to the ropes, then the ropes are broken in the order of the ropes bearing a higher tension, thus causing accidents.

In addition, there is another type of difficulty in such a mooring system. In the case of unloading of a vessel at its moorings, the vessel is going up above the water surface, as the unloading operation proceeds. As a result, tension exerted on ropes is increased, so that unless the ropes are loosened, then excessive tension is exerted thereon, with the result that excessive force is applied to the contacting portions of a vessel with the quay or the mooring facility on a wharf. This results in breakage either in the fuselage of a vessel or in ropes. Accordingly, ropes should be loosened as the vessel is going up above the water surface, in order to avoid such accidents. Thus it is mandatory to maintain tensional force exerted to ropes in a well balanced condition.

SUMMARY OF THE INVENTION

It is accordingly an object of the present invention to provide a vessel mooring system for mooring a vessel to mooring facility on a wharf by means of mooring means, in which tensional force applied to the entire ropes is maintained uniformly.

It is a further object of the present invention to provide a vessel mooring system for mooring a vessel to a mooring facility on a wharf, in which tensional force may be uniformly applied to ropes, irrespective of variations in the condition of waves and tidal currents, even if a vessel is going up above the water surface as an unloading operation proceeds.

It is a further object of the present invention to provide a vessel mooring system of the type described, in which the tensional force applied to ropes is detected so as to indicate if tensional force being applied to the ropes is within specified range, upon shifting of the vessel.

According to present invention, there is provided a vessel mooring system for mooring a vessel to a mooring facility on a wharf by means of a plurality of mooring means, which incorporate tension detecting means therein, whereby the vessel is moored to the mooring facility in a well balanced condition by adjusting the tensional force exerted on the respective mooring means by using tension signals transmitted from the tension detecting means.

BRIEF DESCRIPTION OF THE ACCOMPANYING DRAWINGS

FIG. 1 is a schematic plan view showing a diagrammatic outline of the vessel mooring system according to the present invention;

FIG. 2 is a perspective view of a strain gauge attached to a click relief type hook;

Figure 11:
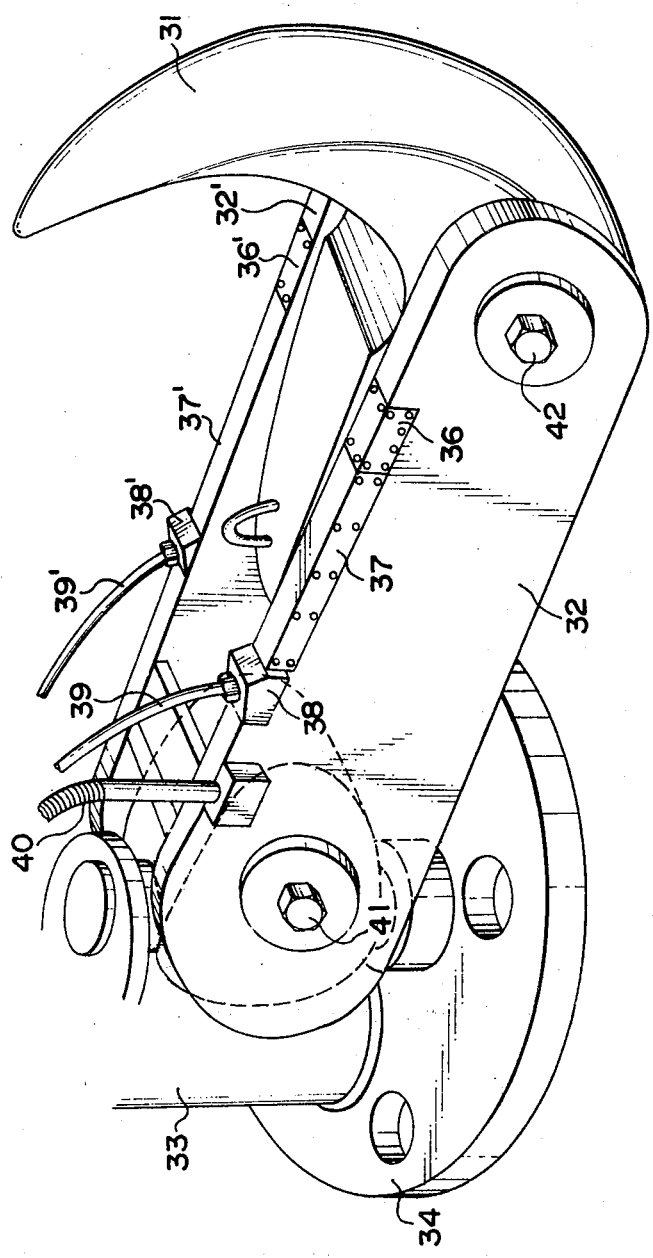

FIGS. 3 (A) and (B) are diagrammatic side and end elevational views, respectively, of the strain gauge in its attached position;

FIG. 4 is a side elevational view of a load cell attached to a hook secured to a bollard type mooring post;

FIG. 5 is a sectional plan view of FIG. 4;

FIG. 6 is a side elevational view of a strain gauge attached to a hook of the same type as that shown in FIG. 4;

FIG. 7 is a sectional plan view of FIG. 6;

FIG. 8 is a side view of a tension meter which is in its detecting condition;

FIG. 9 is a side view of the tension meter shown in FIG. 8 attached to a rope;

FIG. 10 is a front elevational view of tension indicating means adapted to indicate a tension signal;

FIG. 11 is a perspective view of another embodiment; and

FIG. 12 is an enlarged view of a part of FIG. 11.

DESCRIPTION OF PREFERRED EMBODIMENTS

Referring now to FIG. 1, there is shown at 1 an ordinary type vessel which is moored to a mooring facility 3 by means of mooring means 2a and 2f. The mooring facility 3 is a wharf or a pier rigidly anchored to the bottom of the sea (not shown). The mooring facility 3 consists of fixing means 4a to 4f such as dolphins, which are rigidly mounted on the mooring facility 3, mooring posts or hooks 5a to 5f formed on the fixing means 4a to 4f, rope groups 6a to 6f, with the respective ends thereof being in engagement with the hooks 5a to 5f, and winches 7a to 7f which engage the other ends of the rope groups 6a to 6f. The respective rope groups 6a to 6f each include a given number of ropes. The number of ropes is determined by the conditions such as waves, tidal currents and dimensions of a vessel. The diameter of ropes depends on the type of materials used therefor. However, it is customary to use wire ropes having a diameter of 35 mm and synthetic resin ropes having a diameter of 65 mm for large-size vessels. At the present time, the ropes having such diameters are considered to be the maximum from viewpoints of handling. However, in case some improvements are made in the winches or the like, the maximum diameter of wire ropes may be 40 mm, while that of the synthetic resin ropes may be increased to as large as 80 mm.

In the case of tankers, loads applied to the entire ropes for use in mooring are as follows

|  |  | wind velocity 15 m | wind velocity 20 m |
| --- | --- | --- | --- |
| 150,000 gross ton tanker | light load draught ballast | 110 ton 80 t | 200 ton 140 t |
| 200,000 gross ton tanker | light load draught ballast | 142 t 99 t | 252 t 177 t |
| 500,000 gross ton tanker | light load draught ballast | 302 t 222 t | 537 t 392 t |

When the number of ropes required for each tanker is calculated based on the above table for a 500,000 gross ton tanker, in terms of the safety factor of 3, then 10 wire ropes having a diameter of 400 mm are required for a wind velocity of 15 m, while 15 ropes are required for a wind velocity of 20 m. However, the arrangement of those ropes in the respective groups is dependent on the various conditions.

In addition, the number of ropes is also dependent on the positions of which the ropes are secured. In general, the number of ropes may be reduced when tied down to the central portion of a vessel, while the number of ropes should be increased when used in the positions close to the bow and stern of a vessel. It is preferable that the diameter of ropes used be equal. However, the diameters of the ropes may be varied depending on their securing positions. Alternatively, the type of materials used for ropes may be varied depending on the securing positions of ropes. In either case, it is mandatory that the tensional force exerted on the respective ropes, to be exact the tension loads per unit area, be equal with the proviso that the respective ropes are made of the same type of material.

Referring now to FIGS. 2 to 9, the tension detecting means according to the present invention are used in various applications. It is preferable that the tension detecting means be located in such a manner as not to hinder other operations and be in the positions where there are applied high levels of tension.

FIG. 2 refers to an embodiment of the invention wherein a strain gauge 8 is mounted on a mooring hook 5 of a quick release type. As is best shown in FIG. 3(a) and (b), the attaching position of the strain gauge 8 should preferably be positioned above or below a pin 10, as viewed in the vertical direction. The strain gauge 8 consists of two pairs of active gauges 8a and dummy gauges 8b, each pair of which is placed on the opposite outer sides of frame plates 9 and connected by means of conductors 11, thereby presenting a single load cell assembly. In this respect, in case an internal resistance is 480 Ω and an impressed voltage is 10 to 12 V, then an output voltage for 50 ton tension will be 1.9 mV.

FIGS. 4 and 5 show an alternative embodiment in which a hook 12 is interposed between a Bollard type mooring post 5 and a rope 6, with a load cell 13 being attached in a root portion 12a of the hook 12. Shown at 14 is a shock mount made of rubber, which is secured to the bottom of the hook 12. Shown at 15 is a pin, at 16 a rope for mooring a vessel, and at 17 a conductor connected to the load cell 13.

FIGS. 6 and 7 show an arrangement, in which a hook 12 is interposed between the Bollard type mooring post 5 and the rope 6, with a strain gauge 18 being attached in the root portion of the hook 12. The strain gauge consists of an active gauge 18a and a dummy gauge 18b. Shown at 19 is a conductor connecting those strain gauges to suitable means.

FIGS. 8 and 9 show an arrangement, in which a tension meter 20 is attached on the rope 6 mid way thereof. The tension meter 20 may be of a conventional type, and consists of a casing 20a, a pair of supporting rollers 20b and tension roller 20c. FIG. 8 refers to a tension meter in its detecting condition, while FIG. 9 shows a tension meter in its normal condition. In general, for measuring tension on a rope, the tension roller 20c is pressed against the rope 6, giving a specific stroke, and then a pressing force is converted to a tension on the rope.

FIG. 10 shows a tension indicating means for use in indicating a tension signal obtained by detecting a tension on a rope in the manner described earlier. The indicating means 10 is connected by way of conductors 22 to the respective tension detecting means at the respective positions, so that tensional force on respective ropes is indicated by a signal indicating means 23 and/or a signal alarming means (not shown). The signal indicating means 23 may be of an analog type or of a digital type. Alternatively, the signal alarming means may be of a lamp type or a sound generating type. It is preferable that three different types of alarms be generated for three levels of tensions. In addition, the indicating means 21 may be located in the center portion 3a of the mooring facility 3, so that tensions on ropes may be monitored thereat, centrally.

In addition, the control of the respective winches 7a to 7f provided on board the vessel 1, as well, may be centrally controlled in the suitable position on the vessel 1. Still furthermore, the winch control means 50 may be electrically connected to the indicating means 21 to thereby completely automate the tension control operations for ropes 6.

Another embodiment is shown in FIG. 11 and an enlarged view of a part of FIG. 11 is shown in FIG. 12. A wire or a rope (not shown) is hooked around a mooring hook 31 which is pivotally fixed to a pair of frame plates 32, 32' with a pin 42. The frame plates 32 and 32' are fixed to a mooring post 5 with a pin 41. The mooring post 5 is fixed to a base plate 34 which is fixed on a wharf or pier. As seen in FIG. 12, a strain gauge 35 is fixed within a notch portion 43 provided on an upper flange of the frame plate 32. A cable 44 which is connected to the strain gauge 35 is led through a notch or groove 45 in the frame plate 32 and a fitting seat 38 mounted on said upper flange of the plate 32 and finally through a flexible tube 39 to indicating means. The cable 44 may be led out of any appropriate portion other than the one shown in FIGS. 11 and 12. The notched portion 43 and the notch or groove 45 in the frame 32 are covered with a gauge protector 36 made of an I beam and a cable cover 37 made of an L beam in order to protect the strain gauge 35 and the cable 44. The gauge protector 36 and the cable cover 37 form an explosion proof structure with the frame plate 32. In other words, a non-conductive material such as synthetic resin or natural resin is filled within said notched portion 43 and notch groove 45. Also explosion proof slits may be adopted between the frame plate 32 and the notched portion 43 or notch groove 45. At the opposite side in connection with the hook 31, there is provided another frame plate 32' which has similar strain gauge 35', cable 44', gauge protector 36', cable cover 37' etc.

A projected portion (not shown) is provided in the hook 31 at the opposite end to the wire hooking end. The projected portion is engaged with a ratchet (not shown). The engagement between the projected portion of the hook and the ratchet can be disengaged manually, or mechanically by motor driven, hydraulic or compressed air mechanism. In FIG. 11 or FIG. 12, hydraulic pressure is applied to actuate the ratchet to disengage the connection to the projected portion of the hook 31 through a hose 40. As the ratchet and the projected portion of the hook 31 is disengaged the hook 31 is rotated around the pin 42 to some extent and the frame plates 31 and 31' are pushed up because of the pulling power of the wire. When the wire is slipped out of the hook 31, the frame plates 32, 32' and the hook 31 return to the original position from the pushed up position by their own weight to engage the ratchet and the projected portion of the hook 31.

As shown in the embodiment of FIG. 11 and FIG. 12 the strain gauges 35, 35' and the cables 44, 44' are kept in the notched portions 43, 43' and notch grooves 45, 45' with covering by gauge protectors 36, 36' and cable covers 37, 37'. Therefore there is no outwardly projecting portion as to the housing of the strain gauges and cables, so that the strain gauges and cables cannot be broken by collision of the frame plates even when a plurality of hooks are arranged parallel to each other at the same time.

What is claimed is:

1. A system for mooring a vessel to a facility on a wharf or pier, said system comprising a plurality of mooring means, tensional force detecting means comprising a strain gauge incorporated in each said mooring means, said detecting means including means for generating a tension signal and means for adjusting the tensional force exerted on said respective mooring means in accordance with the signals generated by said detecting means whereby the vessel is moored to the facility in a well balanced condition, said mooring means further comprising a plurality of fixing means rigidly secured to the mooring facility, at least one hook formed on each said fixing means, a plurality of ropes each having one end connected to said hook, and a winch which is provided on board said vessel and to which the other end of said ropes are connected, there being further provided a conductor connected to said strain gauge and indicator means connected to said conductor, there being still further provided a notched, covered frame plate pivotally supporting each said hook, said conductor and said strain gauge being positioned within said notch.

2. The vessel mooring system as set forth in claim 1, wherein a visual indicating means is connected by means of a conductor to the respective tensional force detecting means, whereby the tensional force on the respective ropes is signalled by said visual indicating means.

3. The vessel mooring system as set forth in claim 2, wherein said indicating means is located in the central portion of said mooring facility.

4. The vessel mooring system as set forth in claim 2, wherein control means for the respective winches is further included and is located on board the vessel, said control means being electrically connected to said indicating means to thereby present automated tensional force control means for said ropes.

5. The vessel mooring system as set forth in claim 1, wherein an audible indicating means is connected by means of a conductor to the respective tensional force detecting means whereby the tensional force on the ropes is signalled by said audible indicating means.

6. The vessel mooring system as set forth in claim 5, wherein said indicating means is located in the central portion of said mooring facility.

7. The vessel mooring system as set forth in claim 5, wherein control means for the respective winches is further included and is located on board the vessel, said control means being electrically connected to said indicating means to thereby present automated tensional force control means for said ropes.

8. The vessel mooring system as set forth in claim 1, wherein visual and audible indicating means are connected by means of a conductor to the respective tensional force detecting means whereby the force on the ropes is signalled by said visual and audible indicating means.

9. The vessel mooring system as set forth in claim 8, wherein said indicating means is located in the central portion of said mooring facility.

10. The vessel mooring system as set forth in claim 8, wherein control means for the respective winches is further included and is located on board the vessel, said control means being electrically connected to said indicating means to thereby present automated tensional force control means for said ropes.

* * * * *